US012789665B2

United States Patent

(12) United States Patent
Drofenik et al.

(10) Patent No.: US 12,789,665 B2
(45) Date of Patent: Nov. 10, 2026

(54) POWER SUPPLY SYSTEM FOR BIDIRECTIONAL ENERGY FLOW

(71) Applicant: ABB E-mobility B.V., Delft (NL)

(72) Inventors: Uwe Drofenik, Zürich (CH); Thomas Bernhard Gradinger, Aarau Rohr (CH); Francisco Canales, Baden-Dättwil (CH); Gabriel Ignacio Ortiz, Zürich (CH); Ki-Bum Park, Fislisbach (CH); Daniel Rothmund, Mülligen (CH); Levy Costa, Wettingen (CH)

(73) Assignee: ABB E-MOBILITY B.V., Delft (NL)

( * ) Notice: Subject to any disclaimer, the term of this patent is extended or adjusted under 35 U.S.C. 154(b) by 1049 days.

(21) Appl. No.: 17/975,724

(22) Filed: Oct. 28, 2022

(65) Prior Publication Data

US 2023/0050057 A1 Feb. 16, 2023

Related U.S. Application Data

(63) Continuation of application No. PCT/EP2021/059531, filed on Apr. 13, 2021.

(30) Foreign Application Priority Data

Apr. 30, 2020 (EP) .................................... 20172515

(51) Int. Cl.
*B60L 53/67* (2019.01)
*B60L 55/00* (2019.01)

(52) U.S. Cl.
CPC ............... *B60L 53/67* (2019.02); *B60L 55/00* (2019.02); *B60L 2210/30* (2013.01); *B60L 2210/42* (2013.01)

(58) Field of Classification Search
CPC ...... B60L 53/67; B60L 55/00; B60L 2210/30; B60L 2210/42
See application file for complete search history.

(56) References Cited

U.S. PATENT DOCUMENTS

2004/0202012 A1* 10/2004 Ferens .................... H02M 7/08 363/65
2015/0069955 A1* 3/2015 Xu ............................ H02J 9/06 307/23
(Continued)

FOREIGN PATENT DOCUMENTS

CN 102655327 A 9/2012
CN 105098781 A 11/2015
(Continued)

OTHER PUBLICATIONS

Ahmadi et al., "A Review on Topologies for Fast Charging Stations for Electric Vehicles," *2016 IEEE International Conference on Power System Technology* (*POWERCON*), IEEE, 6 pp. (Sep. 28-Oct. 1. 2016).
(Continued)

*Primary Examiner* — Richard V Muralidar
(74) *Attorney, Agent, or Firm* — McCarter & English, LLP; Michael M. Gnibus

(57) ABSTRACT

A power supply system includes a power feeding system for transforming an AC medium-voltage power signal from a medium-voltage grid into a low-voltage power signal for feeding an electricity consumer site. The power supply system further includes a low-voltage multiphase converter for transforming a low-voltage signal into a low-voltage multiphase signal. The multiphase converter is arranged antiparallel to the power feeding system, and an LV/MV multiphase transformer for transforming the low-voltage
(Continued)

multiphase signal into an output-signal that is conformant to the AC medium-voltage power signal.

8 Claims, 10 Drawing Sheets

(56) References Cited

U.S. PATENT DOCUMENTS

| | | | | |
|---|---|---|---|---|
| 2018/0054140 | A1 | 2/2018 | Chen et al. | |
| 2018/0191166 | A1 | 7/2018 | Wagoner et al. | |
| 2021/0188106 | A1* | 6/2021 | Asa | H02M 1/4216 |
| 2023/0050293 | A1* | 2/2023 | Drofenik | H02J 7/02 |

FOREIGN PATENT DOCUMENTS

| | | | | |
|---|---|---|---|---|
| CN | 106549579 | A | 3/2017 | |
| CN | 108528263 | A | 9/2018 | |
| CN | 110182096 | A | 8/2019 | |
| CN | 110352552 | A | 10/2019 | |
| CN | 110450667 | A | 11/2019 | |
| CN | 110626203 | A | 12/2019 | |
| JP | 61-69334 | A | 4/1986 | |
| JP | 2006-211867 | A | 8/2006 | |
| WO | WO 2011/150247 | A1 | 12/2011 | |
| WO | WO-2017060444 | A1 * | 4/2017 | B60L 9/30 |

OTHER PUBLICATIONS

Channegowda et al., "Comprehensive Review and Comparison of DC Fast Charging Converter Topologies: Improving Electric Vehicle Plug-to-Wheels Efficiency," *2015 IEEE 24th International Symposium on Industrial Electronics* (*ISIE*), IEEE, 263-268 (Jun. 3-5, 2015).

Fujita et al., "An Approach to Harmonic Current-Free AC/DC Power Conversion for Large Industrial Loads: The Integration of a Series Active Filter with a Double-Series Diode Rectifier," *IEEE Transactions on Industry Applications*, 33(5): 1233-1240 (Sep.-Oct. 1997).

Le Roux et al., "Current Regulation for a Series Active Filter Integrated with a Diode Rectifier," *IEEE 34th Annual Conference on Power Electronics Specialist* (*PESC '03*), IEEE, 3: 1026-1031 (Jun. 15-19, 2003).

Le Roux et al., "Digital Control of an Integrated Series Active Filter and Diode Rectifier with Voltage Regulation," *IEEE Transactions on Industry Applications*, 39(6): 1814-1820 (Nov. 24, 2003).

Mino et al., "Novel Hybrid 12-Pulse Line Interphase Transformer Boost-Type Rectifier with Controlled Output Voltage," *The 4th International Power Electronics and Motion Control Conference* (*IPEMC 2004*), IEEE, 2: 8 pp. (Aug, 14-16, 2004).

Mysiak et al., "A multi-pulse diode rectifier with a coupled three-phase reactor and additional small shunt active power filter," *2007 European Conference on Power Electronics and Applications*, IEEE. 10 pp. (Sep. 2-5, 2007).

Mysiak et al., "Experimental Test Results of the 150KVA 18-Pulse Diode Rectifier with Series Active Power Filter," *2016 10th International Conference on Compatibility, Power Electronics and Power Engineering* (*CPE-Powereng*), IEEE, 380-383 (Jun. 29-Jul. 1, 2016).

Zare et al., "A Modular Active Front-End Rectifier with Electronic Phase-Shifting for Harmonic Mitigation in Motor Drive Applications," *IEEE Transactions on Industry Applications*, 53(6): 12 pp. (2017).

European Patent Office, Extended European Search Report in European Patent Application No. 20172515.7, 10 pp. (Sep. 22, 2020).

Niermann, "New rectifier circuits with low mains pollution and additional low cost inverter for energy recovery," *Proc. of 3rd European Conference on Power Electronics and Applications* (*EPE*), 3: 1131-1136 (Oct. 9-12, 1989).

European Patent Office, International Search Report in International Patent Application No. PCT/EP2021/059531, 4 pp. (Jul. 13, 2021).

European Patent Office, Written Opinion in International Patent Application No. PCT/EP2021/059531, 8 pp. (Jul. 13, 2021).

* cited by examiner

POWER SUPPLY SYSTEM FOR BIDIRECTIONAL ENERGY FLOW

CROSS-REFERENCE TO RELATED APPLICATIONS

This patent application claims priority to International Patent Application No. PCT/EP2021/059531, filed on Apr. 13, 2021, and to European Patent Application No. 20172515.7, filed on Apr. 30, 2020, each of which is incorporated herein in its entirety by reference.

FIELD OF THE DISCLOSURE

The present disclosure relates to the field of power supplies, particularly for a bidirectional energy flow between a medium-voltage grid and a low-voltage electricity consumer site, e.g. for electric vehicles.

BACKGROUND OF THE INVENTION

Power supplies, e.g. for charging systems for electric vehicles (EV) and other low-voltage (LV) electricity consumer sites, require high power levels. Therefore, in many cases a medium-voltage grid (MV grid) is used as a base for the power supplies. Additionally, for many systems legal conditions and/or further requirements for MV grid standards need to be fulfilled. Furthermore, in some cases there is a request for feeding energy sources like solar panels and other sources, which are available at the LV side of the charging station, into the MV grid. Thus, at least partly bidirectional power flow these power supplies needs to be supported. This may result in bulky frontends for the system that feeds the charging pole.

BRIEF SUMMARY OF THE INVENTION

In one general aspect, the present disclosure describes an improved power supply for a low-voltage electricity consumer site, e.g. for electric vehicles.

One aspect relates to a power supply system for a bidirectional energy flow between a medium-voltage grid and a low-voltage electricity consumer site. The power supply system comprises a power feeding system, configured for transforming an AC medium-voltage power signal from the medium-voltage grid into a low-voltage power signal for feeding the electricity consumer site. Furthermore, the power supply system comprises a low-voltage multiphase converter, configured for transforming a second low-voltage signal, which is based on a first low-voltage signal from the electricity consumer site, into a low-voltage multiphase signal, wherein the multiphase converter is arranged anti-parallel to the power feeding system; and an LV/MV multiphase transformer, configured for transforming the low-voltage multiphase signal into an output-signal that is conformant to the AC medium-voltage power signal.

The bidirectional energy flow is to support energy transfer both from a medium-voltage (MV) source to a low-voltage (LV) sink and from a LV source to a MV sink. The energy flow of the energy may be unsymmetrical, e.g. with lower—possibly with significantly lower—energy flow from the LV source to the MV sink than from the MV source to the LV sink. The MV source and sink may be an MV grid, e.g. with a frequency of 50 Hz or 60 Hz and voltages of about 10 kV to 30 kV. The LV source and sink may be a bidirectional low-voltage electricity consumer site, for instance a charging systems for EVs that is configured to feed energy sources like batteries, solar panels and other sources, which are available at the low-voltage electricity consumer site, to the MV site, e.g. into the MV grid. In some cases, the batteries at the LV site may be employed for grid stabilization.

The power feeding system uses the MV source and delivers an LV DC voltage or an LV AC voltage, possibly an LV HF-AC (high-frequency alternating current) voltage with frequencies of about 5 kHz-100 kHz. The low-voltage power signal at the LV consumer site may be fixed, and have a voltage in a range from about 400 V to 1000 V, or about 230 V, or about 110 V. The LV consumer site may comprise further modules, e.g. for transforming the LV signal into standardized signals for EV stations, possibly into a variable and/or controlled voltage.

The type of the low-voltage multiphase converter, from the LV power source, depends on the type of signal delivered from the LV power source. The LV power source may be, for instance, a battery that delivers, as the first low-voltage signal, a DC voltage, which is, as the second low-voltage signal, fed directly into the input of the multiphase converter. The LV power source may be, as another example, an HF-AC as the first low-voltage signal and may be transformed by an AC/DC-converter into a DC signal as the second low-voltage signal. The LV power source may be, additionally or alternatively, any kind of excess energy, which the system allows to feed it back to the MV grid.

The multiphase converter may generate, e.g., a 3 phases 50 Hz signal. This signal may depend on the type of signal in the MV grid. The multiphase converter may further act as active filter, thus allowing in a flexible way to fulfil the MV grid standard. The LV/MV multiphase transformer may transform the low-voltage multiphase signal into an output-signal that is conformant to the AC medium-voltage power signal. The conformance may be established by the combination of the multiphase converter and the LV/MV multiphase transformer. Conformant may mean, for instance, that is has the same phase as the MV grid, and fulfils further MV grid requirements, for example w.r.t. current harmonic limits and/or further requirements, e.g. determined by IEEE 519 and/or by IEC 61000-3-6.

Consequently, the features of the power supply system advantageously lead to a system that masters bidirectional power flow with low distortion. The clear concept further leads to a high flexible system, e.g. w.r.t. to the number of LV sources. Moreover, the system components are of small size—e.g. compared to a conventional 50 Hz transformer—and/or the system has low manufacturing and/or maintenance costs.

BRIEF DESCRIPTION OF THE SEVERAL VIEWS OF THE DRAWING(S)

Each of FIGS. 1*a*, 1*b*, and 1*c* is a schematic diagram for a particular design of a part of a power supply system according to embodiments of the present disclosure.

FIGS. 2*a* and 2*b* are schematics of various designs of a part of a power supply system according further embodiments of the present disclosure.

Each of FIGS. 9*a*, 9*b*, 9*c*, 9*d*, and 9*e* are graphs containing results of simulations of an MV grid behavior of a power supply system according to an embodiment of the present disclosure.

DETAILED DESCRIPTION OF THE INVENTION

Figures 1A, 1B, 1C:
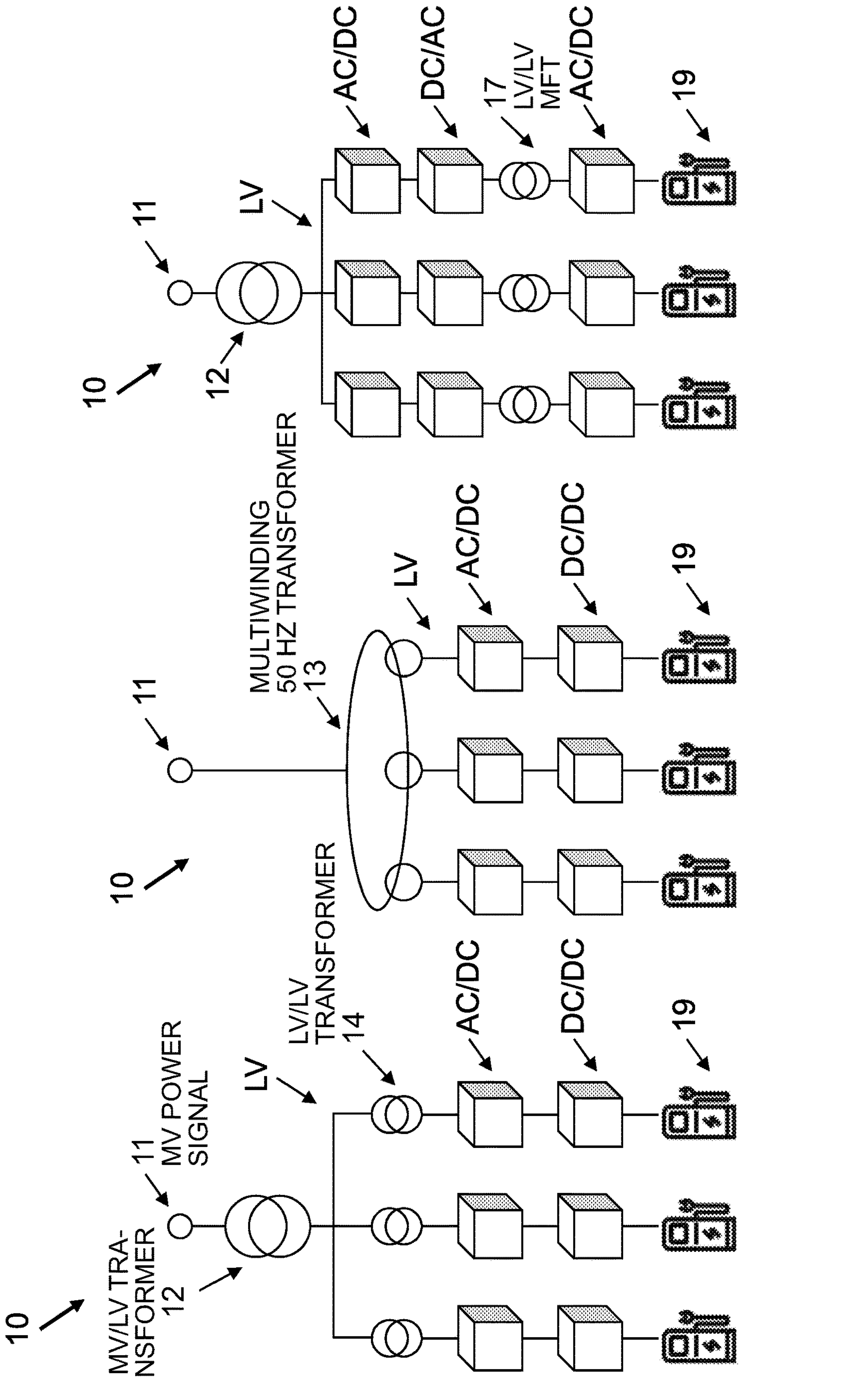

FIG. 1*a* shows a power supply system 10 with a 50 Hz MV/LV-transformer 12 for an insulation to an MV grid or AC medium-voltage power signal 11. The 50 Hz low-voltage signal is transformed by a 50 Hz LV/LV-transformer 14. The LV/LV-transformers 14 separate galvanically the plurality of charging poles 19 from each other. The two conversion stages of low-frequency transformers may result in a large system w.r.t. footprint and size. Between each one of the LV/LV-transformers 14 and the respective charging poles 19, an AC/DC-transformer and a DC/DC-transformer is arranged.

FIG. 1*b* shows a power supply system 10 with a multi-winding 50 Hz transformer 13. This is a system with one conversion stage, thus both transforming MV to LV and providing of the plurality of charging poles 19 from each other. FIG. 1*c* shows a power supply system 10 with a first conversion stage of a 50 Hz MV/LV-transformer 12. As a second conversion stage, the system 10 has a low voltage Medium-Frequency Transformer, LV/LV-MFT 17, whose higher frequency is provided by a DC/AC-transformer.

Figure 2B:
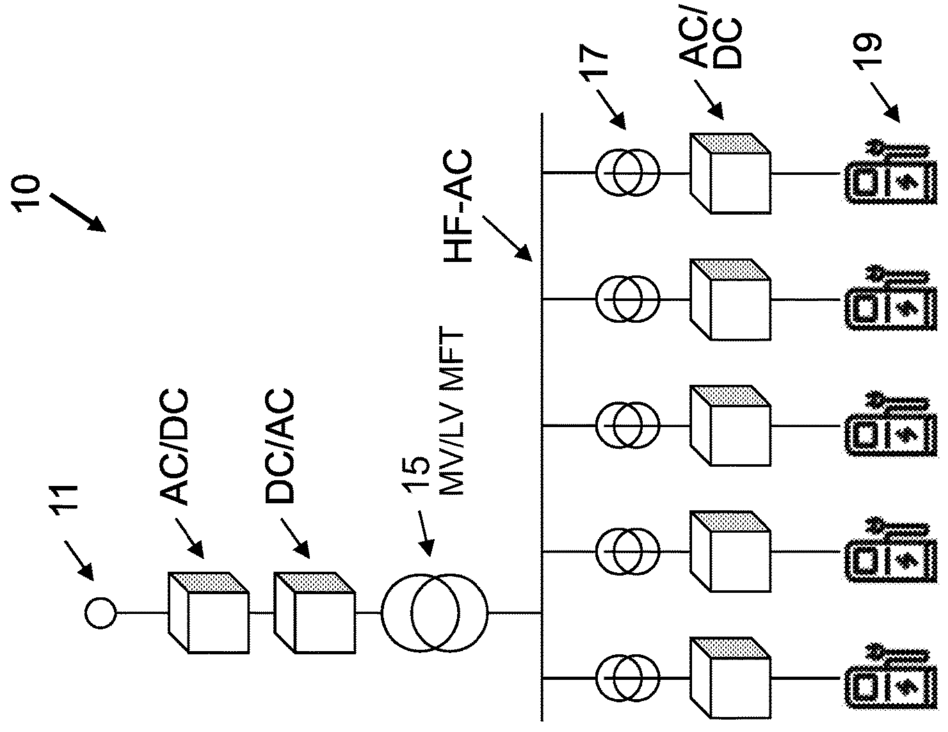
Figure 2A:
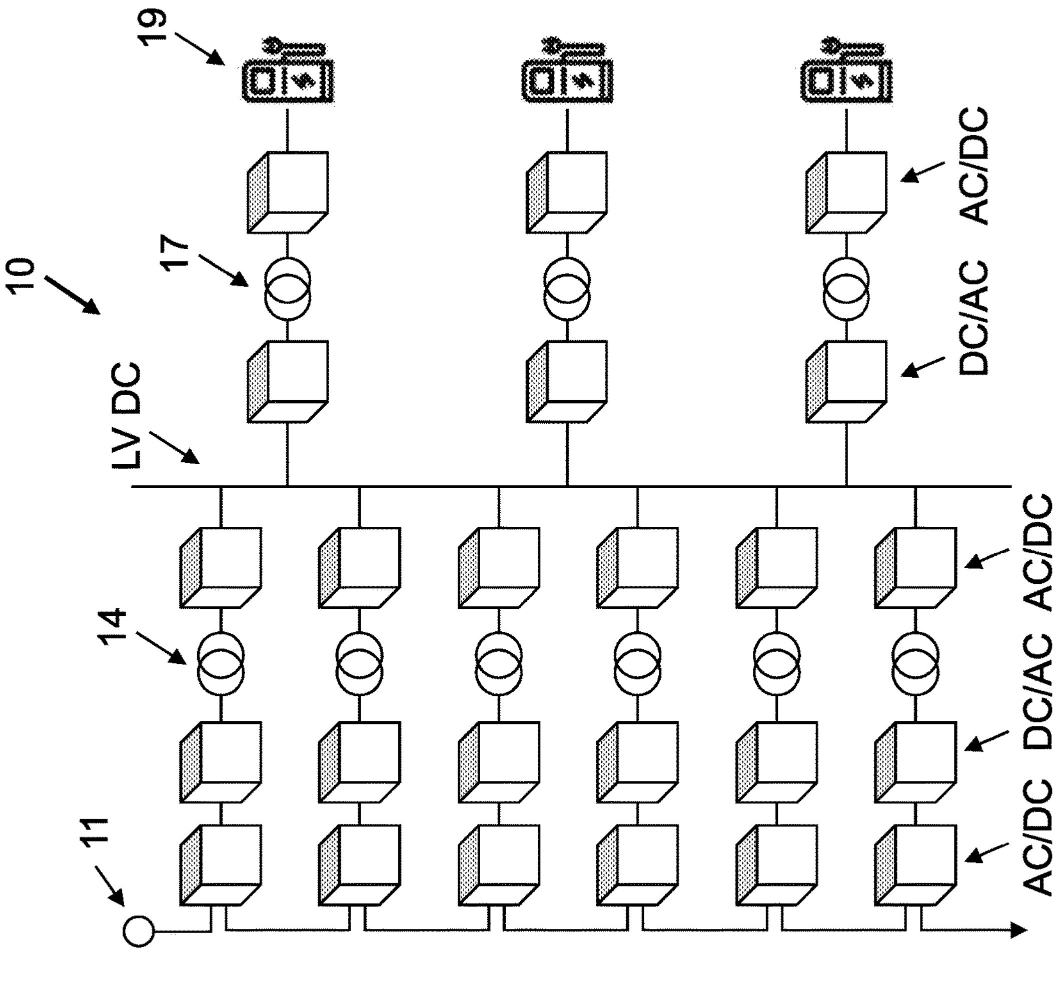

FIG. 2*a* shows a power supply system 10 with MV-MFTs 14 for a galvanic separation to the MV grid 11. Furthermore, it has LV/LV-MFTs 17 for a galvanic separation of the charging poles 19 from each other.

FIG. 2*b* shows a power supply system 10 with a first conversion stage, an MV/LV-MFT 15, which is supplied by an MV-DC/AC converter for a high frequency, HF-AC. The second conversion stage are LV/LV-MFTs 17 for a galvanic separation of the charging poles 19 from each other.

Figure 3:
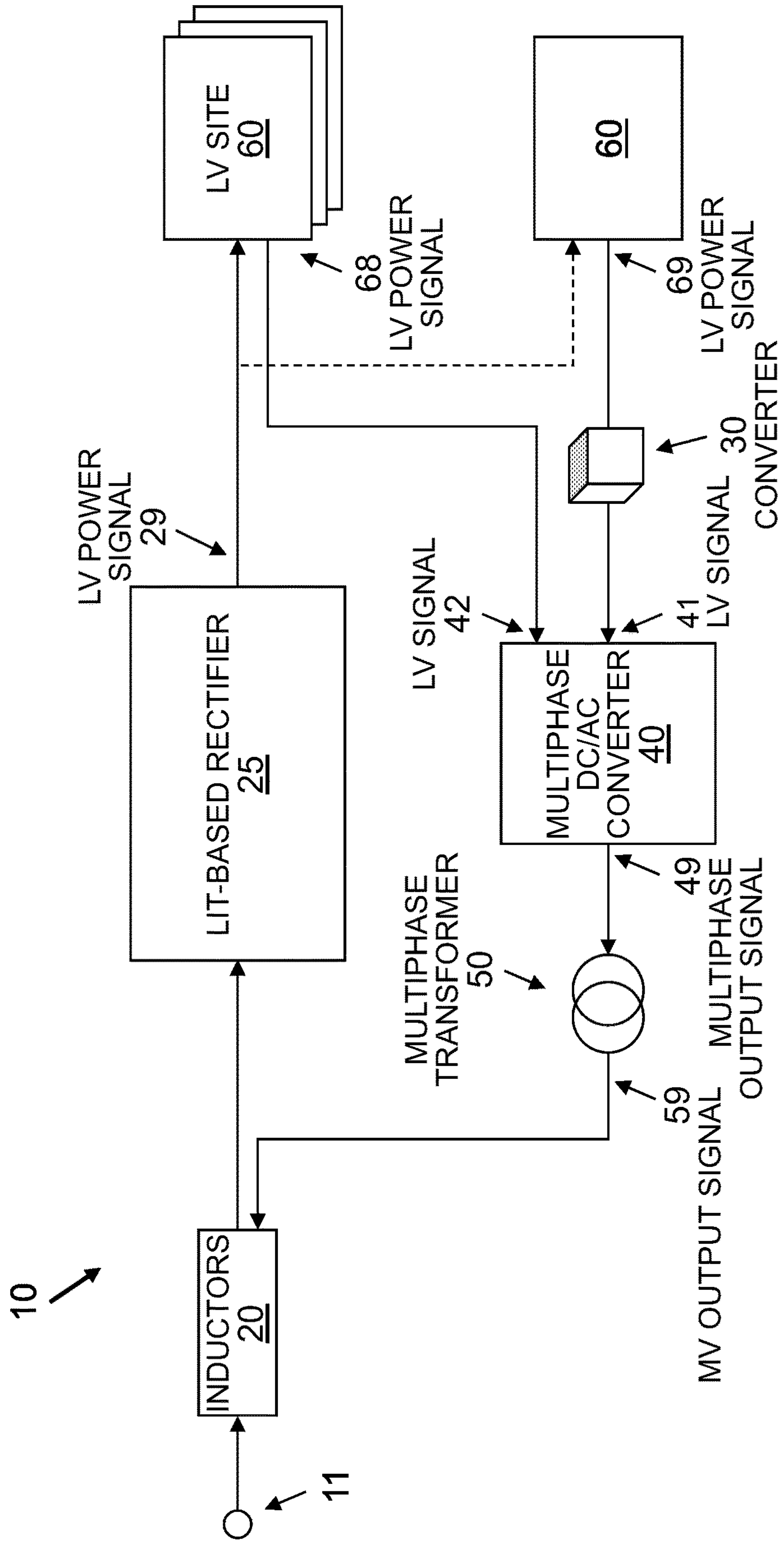
FIG. 3 is a block diagram for a power supply system according to an embodiment of the present disclosure.

FIG. 3 shows a schematic overview over a power supply system 10. The power supply system 10 has in its "forward branch" a power feeding system 25. The power feeding system 25 is configured for transforming an AC medium-voltage power signal from the medium-voltage grid (MV grid) 11 into a low-voltage power signal (LV signal) 29. The LV signal 29 may feed a plurality of electricity consumer sites (LV sites) 60. The LV sites may have further modules, e.g. for controlling and/or distributing the power. Examples may comprise charging systems for electric vehicles. At least some of the LV sites 60 may have a bidirectional energy flow, i.e. some LV sites may be configured to deliver energy in forward direction, some LV sites in backward direction, and/or some LV sites in both directions.

In the "backward branch", i.e. arranged antiparallel to the power feeding system 25, the power supply system 10 has a low-voltage multiphase DC/AC-converter 40. The low-voltage multiphase DC/AC-converter 40 is configured for transforming a second DC low-voltage signal 41, 42, which is based on a first low-voltage signal 68, 69 from the electricity consumer site 60, into a low-voltage multiphase signal 49. The multiphase converter 40 may be connected directly to one or more of the LV sites 60, for example in cases when the LV site 60 delivers a DC power signal as a first low-voltage signal 68, 69. The multiphase converter 40 may be connected via a converter 30 to one or more of the LV sites 60. The converter 30 may be configured for transforming the first low-voltage signal 68, 69 from the electricity consumer site 60, into the DC low-voltage signal 41, 42. The converter 30 is a DC/AC-converter, an AC/AC-converter, and/or an AC/DC-converter with a DC/AC-converter. This may depend on the type of the first low-voltage signal 68, 69 delivered the electricity consumer site 60.

The converter 30 may be integrated with the multiphase converter 40, e.g. as a hardware part of it. The converter 30 may be a separate part or integrated with one or more of the LV sites 60. The multiphase converter 40 may deliver a signal of, for instance, 3 phases on its output 49. The low-voltage multiphase signal 49 is forwarded to an LV/MV multiphase transformer 50. The LV/MV multiphase transformer 50 transforms the LV multiphase signal 49 into an MV output-signal 59 that is conformant to the AC medium-voltage power signal of the MV grid 11. Conformant may mean, for instance, that is has the same phase as the MV grid, and fulfils further MV grid requirements, for example w.r.t. current harmonic limits and/or further requirements, e.g. determined by IEEE 519 and/or by IEC 61000-3-6.

Figure 4:
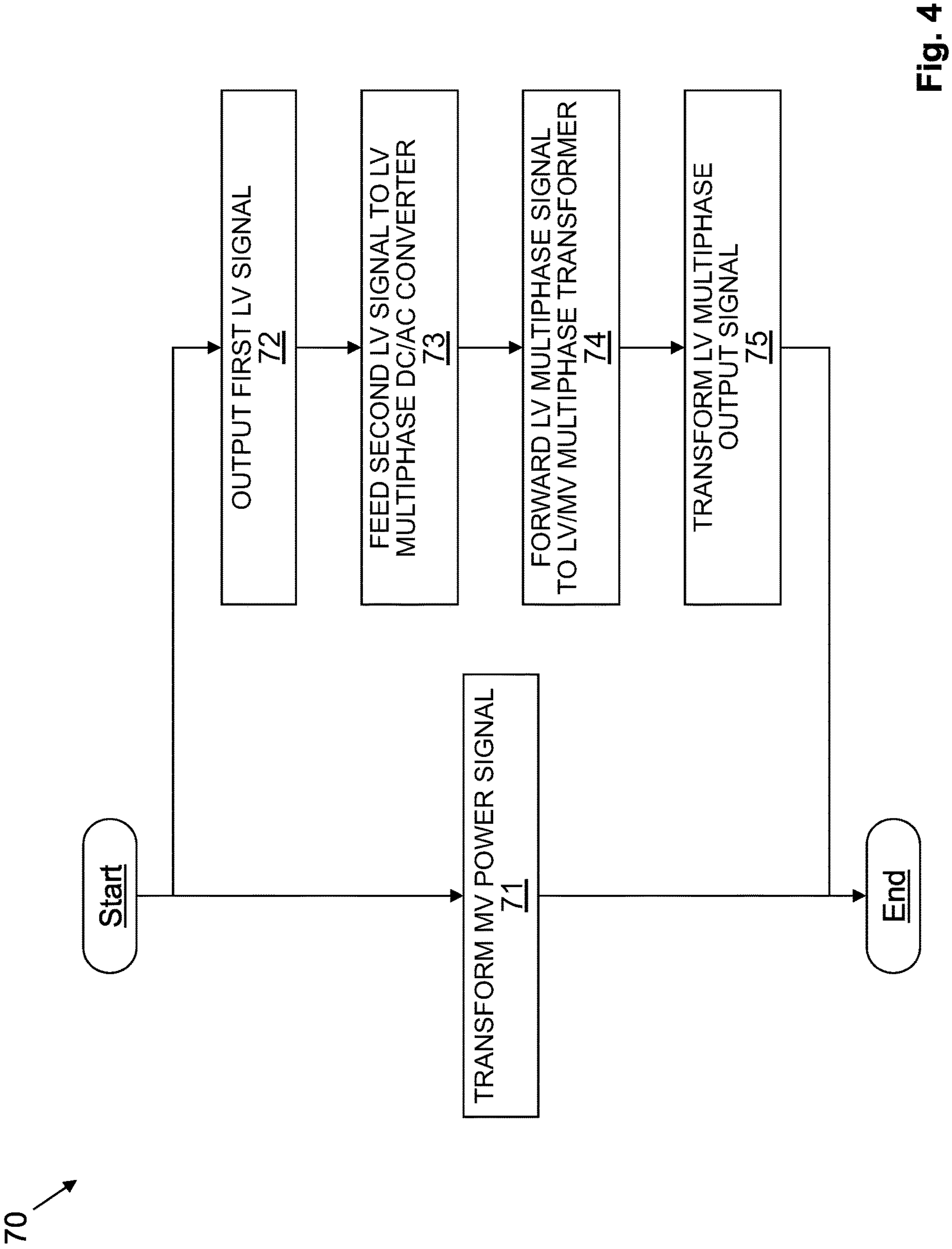
FIG. 4 is a flowchart for a method according to an embodiment of the present disclosure.

FIG. 4 shows schematically a flowchart 70 of a method according to an embodiment. The flowchart 70 depicts a method for supporting a bidirectional energy flow between a medium-voltage grid 11 (see, e.g., FIG. 3) and a low-voltage electricity consumer site 60. In a step 71, an AC medium-voltage power signal 11 from the medium-voltage grid is transformed, by utilizing a power feeding system 25, into a low-voltage power signal 29 for the electricity consumer site 60. In a step 72, a first low-voltage signal 68, 69 is output, from the electricity consumer site 60. In a step 73, a second low-voltage signal 41, 42, which is based on the first low-voltage signal 68, 69, is fed into a low-voltage multiphase DC/AC-converter 40, which is arranged antiparallel to the power feeding system 25. In a step 74, a low-voltage multiphase signal 49 from the output of the low-voltage multiphase DC/AC-converter 40 is forwarded to an LV/MV multiphase transformer 50. In a step 75, the low-voltage multiphase output signal 49 is transformed, by utilizing the LV/MV multiphase transformer 50, into an output-signal 59 that is conformant to the AC medium-voltage power signal 11. The steps 72 to 75 may be performed in parallel to step 71.

Figure 5:
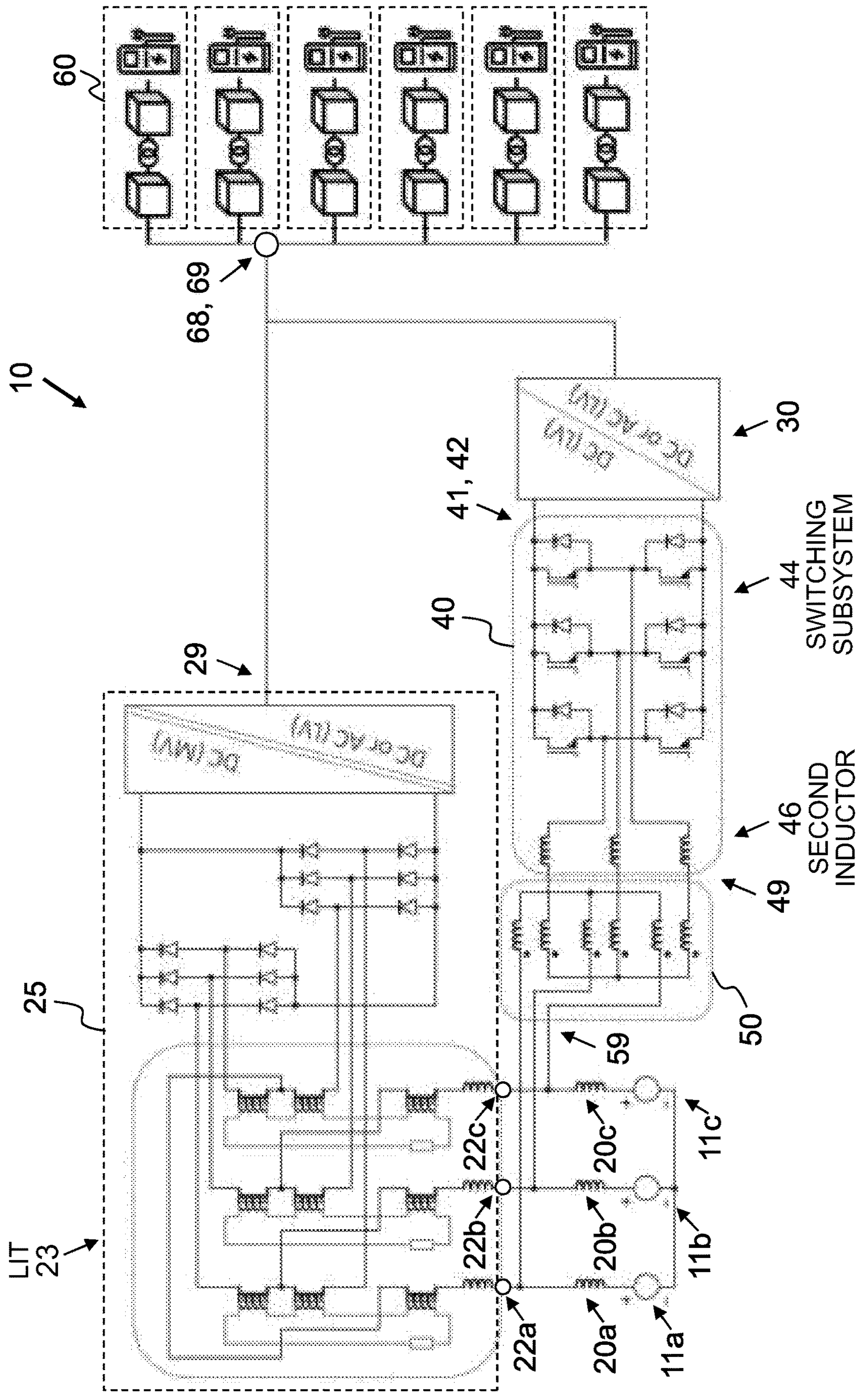
FIG. 5 is a schematic of an exemplary system for implementing the power supply system of FIG. 3.

FIG. 5 shows schematically an example of the system of FIG. 3. This embodiment of a power supply system 10 comprises a LIT-based rectifier 25 with a 12-pulse LIT 23. Each input 22*a*, 22*b*, 22*c* of the LIT 23 is connected via inductors 20*a*, 20*b*, 20*c* to each phase 11*a*, 11*b*, 11*c* of the MV grid 11. The LIT-based rectifier 25 produces a LV power signal 29 for feeding the plurality of electricity consumer sites 60. The LIT-based rectifier's first component is a 12-pulse LIT (Line Interphase Transformer) 32, whose outputs 35 are fed to a multi-pulse diode rectifier 37. The LIT shown in FIG. 5 (and, analogously, in FIG. 6) depicts the magnetic cores, which couple the inductive components of the LIT, as lines coupled by a magnetic reluctance (a small rectangular box as equivalent circuit diagram).

In the "backward direction", at least some of the LV sites 60 may deliver a first LV power signal 68, 69 of different type, i.e. possibly of different and/or of variable voltage, of DC and/or of AC of different frequency, possibly of 50 Hz, 60 Hz, in a range of about 5 kHz-20 kHz, and/or other frequencies, with fixed or variable frequency. Depending on the type of LV source, a converter 30 is arranged in the "backward branch" of the power supply system 10. The converter 30 feeds a second DC low-voltage signal 41, 42 to the LV multiphase DC/AC-converter 40. The multiphase converter 40 produces a low-voltage multiphase signal 49, which is fed into a LV/MV multiphase transformer 50. The multiphase converter 40 comprises a multiphase switching subsystem 44 and a second inductor 46. The second inductor 46 is arranged between the multiphase switching subsystem 44 and the LV/MV multiphase transformer 50. Alternatively, the second inductor 46 may be part of the LV/MV multiphase transformer 50. The LV/MV multiphase transformer 50 transforms the low-voltage multiphase signal 49 into an output-signal 59, and feeds the output-signal 59 to the MV grid 11, via inductors 20*a*, 20*b*, 20*c* for each phase of the output-signal 59 and the MV grid 11. The output-signal 59 that is conformant to the AC medium-voltage power signal 11 and, additionally, its distortion factor is further reduced by the inductors 20*a*, 20*b*, 20*c*. The inductivity of the inductors 20*a*, 20*b*, 20*c* may be quite small; an example could be around 34 mH for the shown embodiment with a 12-pulse LIT.

Figure 6:
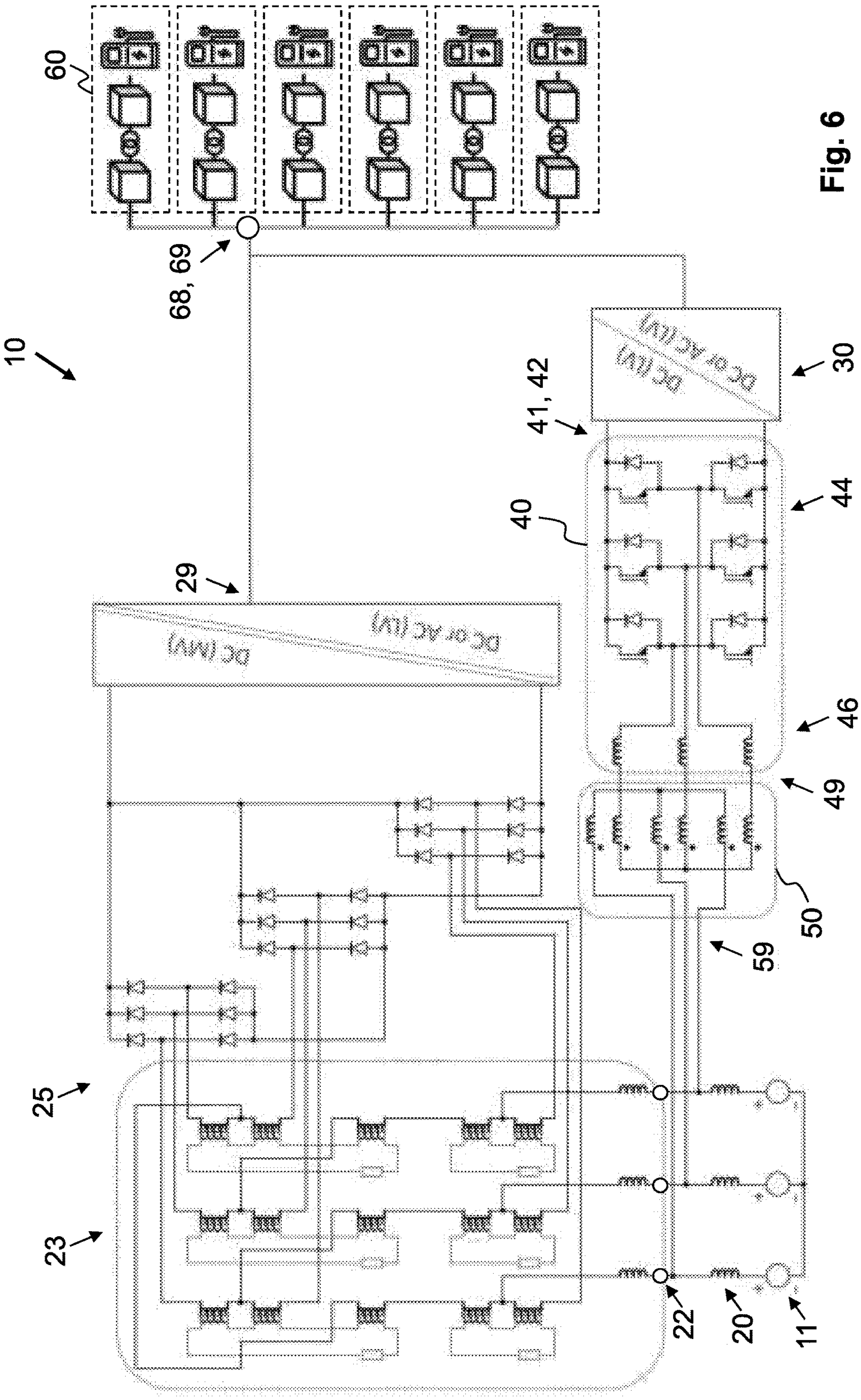
FIG. 6 is a schematic of another exemplary system for implementing the power supply system of FIG. 3.

FIG. 6 shows schematically a further example of the system of FIG. 3. This embodiment of a power supply system 10 comprises a LIT-based rectifier 25 with an 18-pulse LIT 23. The higher number of pulses may advantageously lead to a smaller distortion factor and, thus, to further reduced inductors 20*a*, 20*b*, 20*c*. In further aspects, the embodiment of FIG. 6 is quite similar to the one of FIG. 5. Particularly, the same reference signs indicate the same or similar components.

Figure 7:
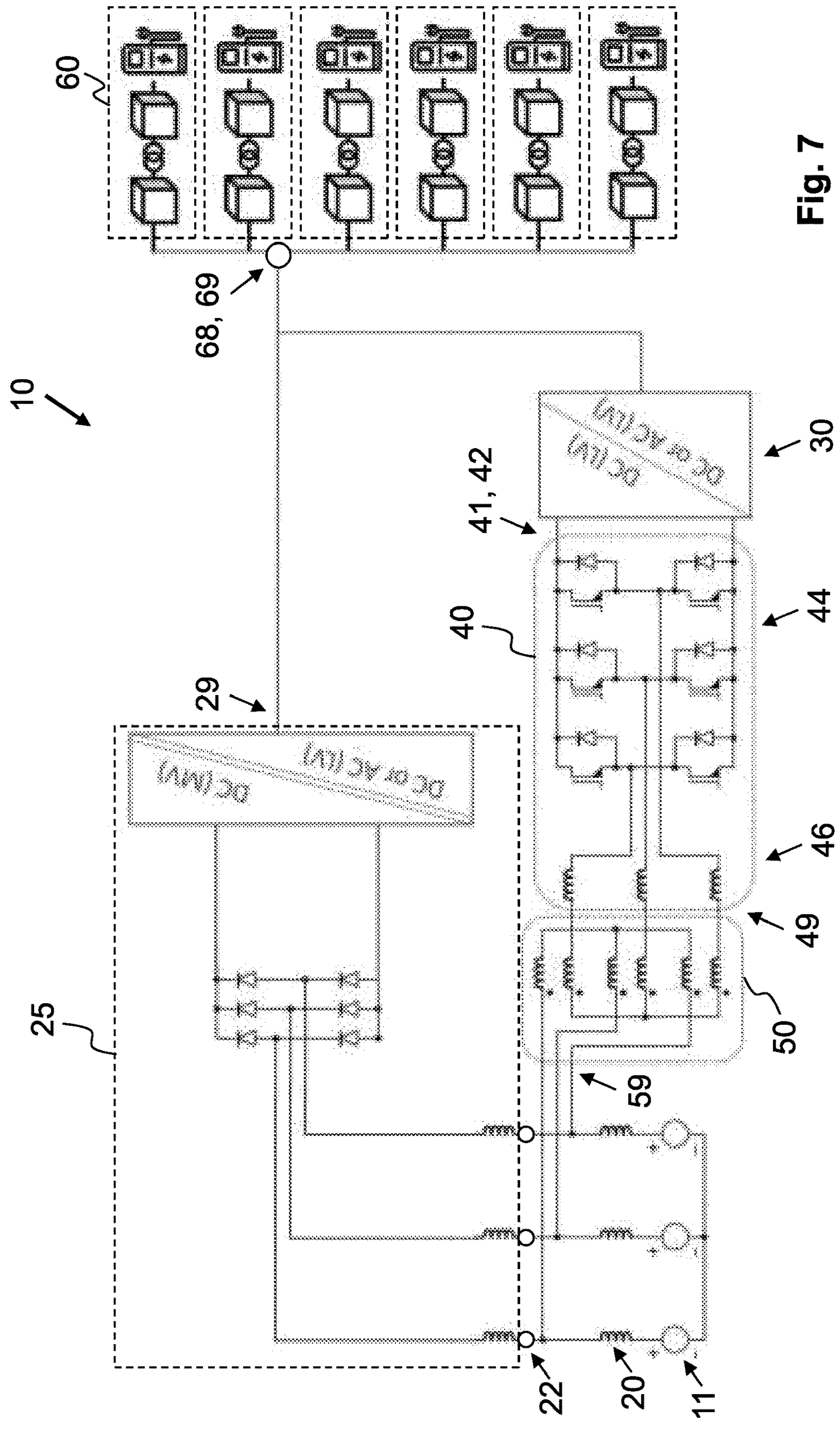
FIG. 7 is a schematic of another exemplary system for implementing the power supply system of FIG. 3.

FIG. 7 shows schematically a further example of the system of FIG. 3. This embodiment of a power supply system 10 comprises a simple diode bridge in the power feeding system 25. In further aspects, the embodiment of FIG. 6 is quite similar to the one of FIG. 5. Particularly, the same reference signs indicate the same or similar components.

Figure 8:
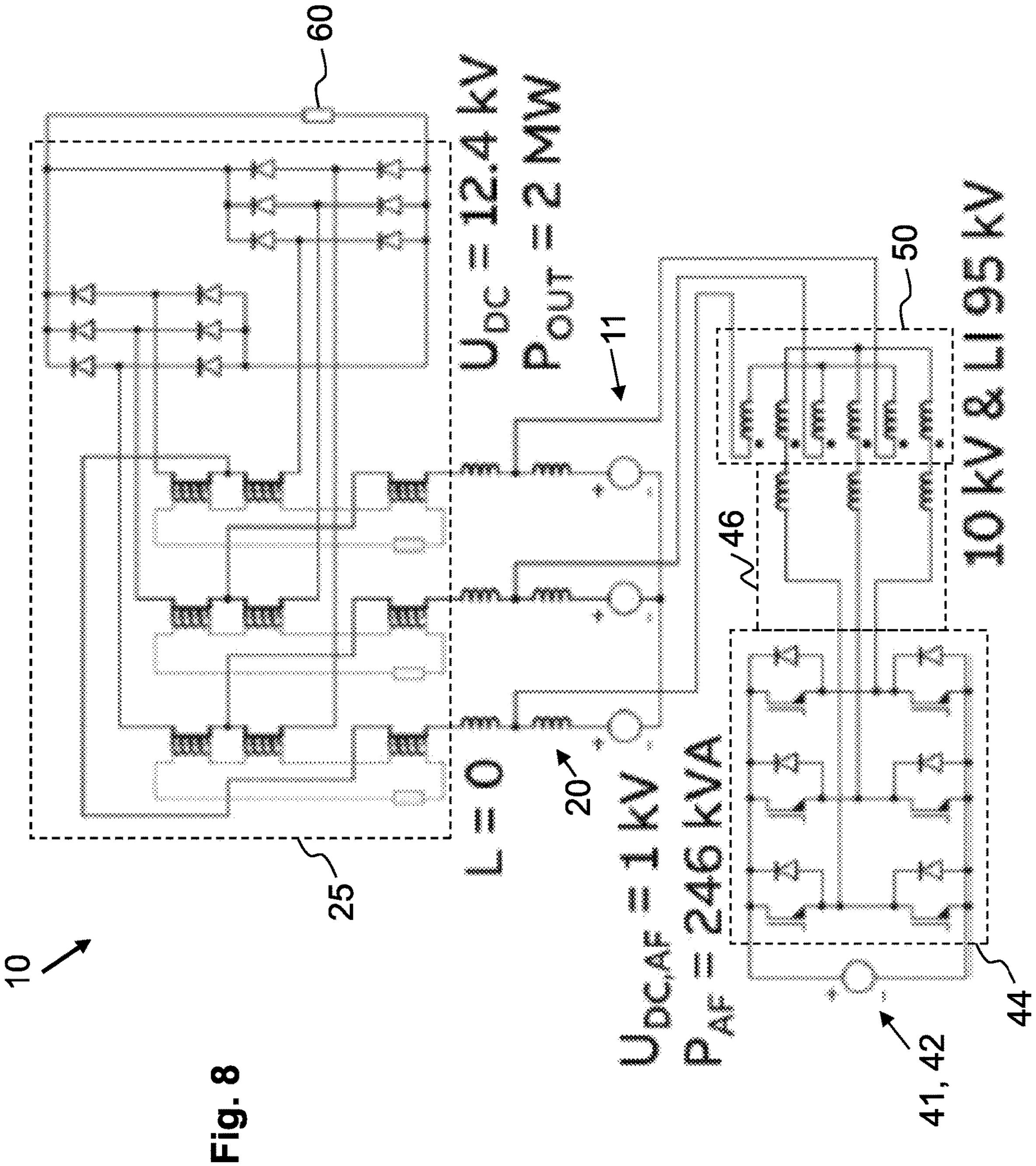
FIG. 8 is a schematic of a simulation example that corresponds to the schematic of FIG. 5.

FIG. 8 shows schematically a simulation example of a power supply system 10, analogously to FIG. 5. The power feeding system 25 delivers a max. power of 2 MW to the plurality of LV sites 60, with a voltage of $U_{DC}$=12.4 kV. The LV sites 60 deliver a power of 246 kVA, with a voltage of $U_{DC,AF}$=1 kV. The LV/MV multiphase transformer 50 transforms this to a voltage of 10 kV. Simulation results are shown in FIGS. 9*a* to 9*d*.

Figure 9A:
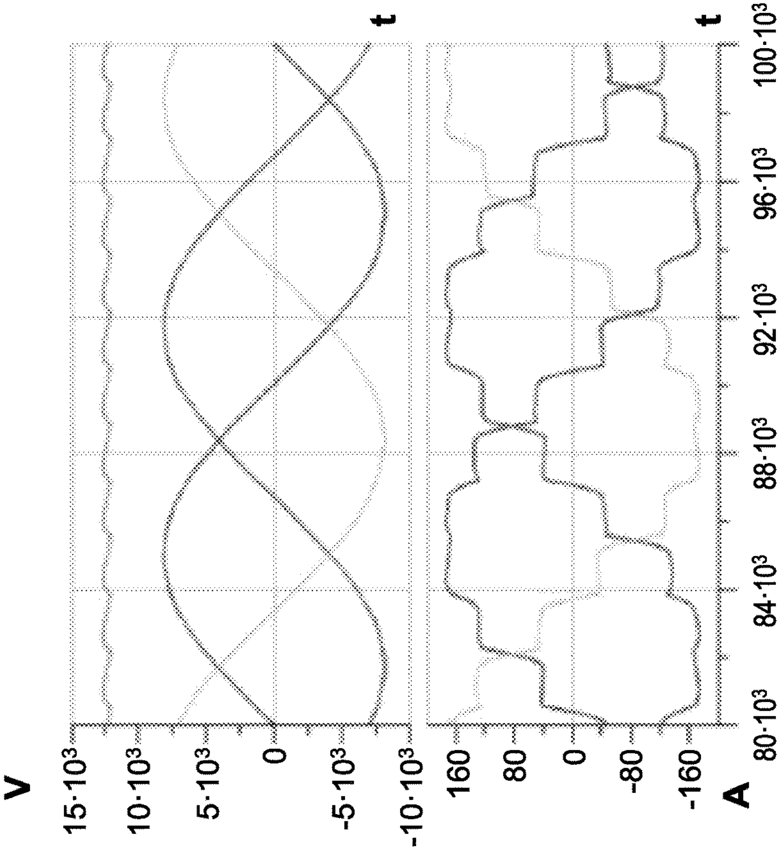
Figure 9B:
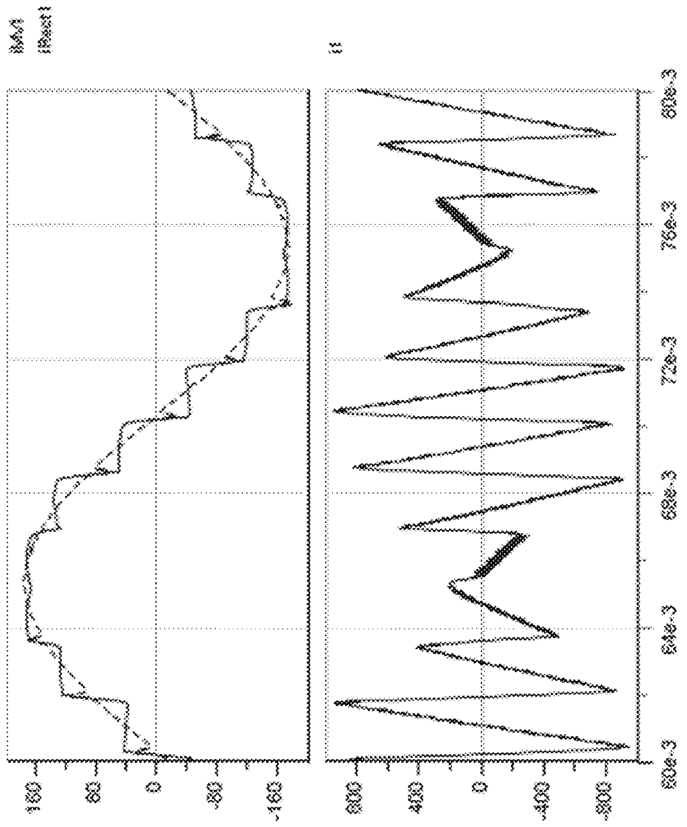
Figure 9E:
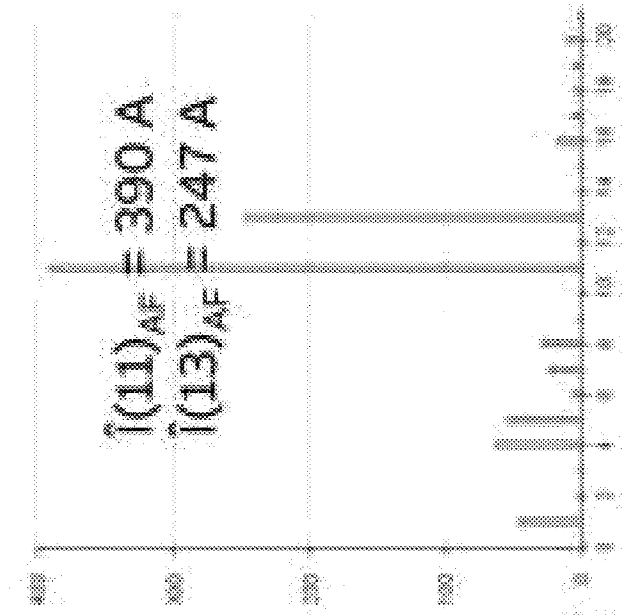
Figure 9D:
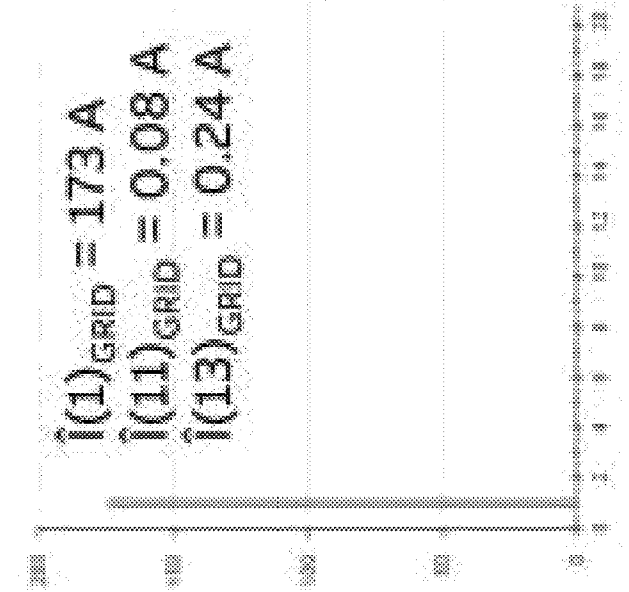
Figure 9C:
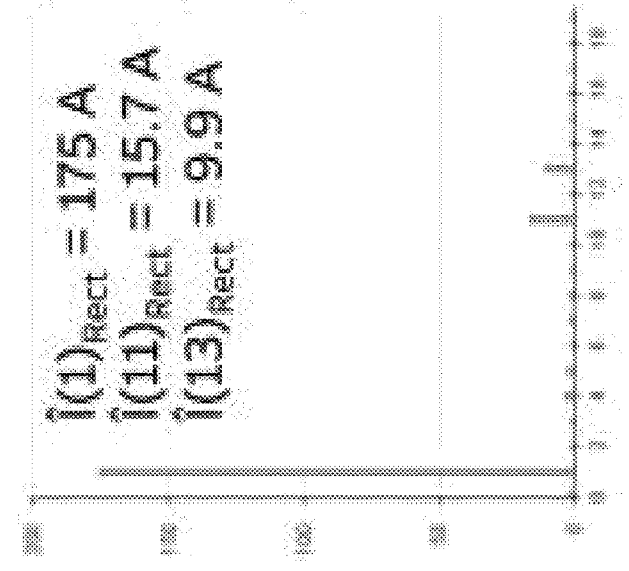

FIG. 9*a* shows simulated waveforms of the MV grid voltages (above) and the 12-pulse input current of the LIT-based rectifier (below), with a rectified current of I=124 A. FIG. 9*b* shows the effect of the active filter 40 arranged in the "backward branch". In the diagram above, the straight curve shows a LIT-based rectifier input current. In the diagram below, the curve shows a "corrective" current injected by the active filter. The effect can be seen in the broken-line curve in the above diagram: The broken-line curve shows a very smooth curve with low distortion. This is also visible in the diagrams of FIGS. 9*c* to 9*e*. FIG. 9*c* shows the $11^{th}$ and the $13^{th}$ current harmonics produced by the LIT-based rectifier 25 of FIG. 8. FIG. 9*d* shows the result of injecting current by the active filter. It is clearly visible that the distortion energy is significantly reduced. FIG. 9*e* shows, how in this example the injected current may look like.

In various embodiments, the power feeding system comprises a Line Interphase Transformer (LIT). The power feeding system may be implemented as a LIT-based rectifier. The LIT may be a multi-pulse LIT with a pulse number of 12, of 18, of 24, or of higher than 24. Accordingly, due to the multi-pulse LIT the harmonics of the passive main rectifier may be quite small. Furthermore, the active filter may be designed for just a fraction of the power of the full station. This may contribute to use a 50 Hz transformer of the active filter, which is quite small, and may lead to reduced cost and/or to small no-load losses.

In various embodiments, the low-voltage multiphase converter is an active filter that injects current, based on the signal of the MV grid. Particularly, the multiphase converter injects current, which reduces current harmonics greater or equal two in the MV grid. This advantageously not only contributes to a distortion compensation of the current fed in "backward direction" to the MV grid, but may even contributes to a distortion compensation of the complete power supply system, thus further improving its conformance to the AC medium-voltage power signal.

In various embodiments, the system further comprises a first inductor that is arranged between the AC medium-voltage power signal and the power feeding system, and is arranged between the AC medium-voltage power signal and the LV/MV multiphase transformer. Thus, the inductor, which connects MV grid and, e.g., the LIT-based rectifier, is designed to reduce the distortion factor and/or the current harmonics, which may affect the MV grid. In at least some countries, this may be a legal and/or a standard requirement, e.g. to comply with relevant MV grid standards, e.g. with IEEE 519 or IEC 61000-3-6. Advantageously, said requirements may be fulfilled without complex and expensive active frontends to the MV grid, thus leading to a simpler design, lower manufacturing-cost, and/or reducing maintenance efforts.

In various embodiments, the LV multiphase DC/AC-converter comprises a multiphase switching subsystem and a second inductor, which is arranged between the multiphase switching subsystem and the LV/MV multiphase transformer. The second inductor may be integrated into the LV/MV multiphase transformer. This arrangement may contribute to further reduce the distortion factor that is forwarded to the MV grid.

In various embodiments, the power supply system further comprising a converter, which is configured for transforming the first low-voltage signal from the electricity consumer site (60), into the DC low-voltage signal. The converter may be a DC/AC-converter, an AC/AC-converter, and/or an AC/DC-converter with a DC/AC-converter. The type of the converter may depend on the LV power source, e.g. if the power source is a DC source, or an AC source, and/or the frequency of the AC source. Thus, the converter may adapt the voltage and/or the frequency of the LV power source to the input of the low-voltage multiphase DC/AC-converter. This advantageously allows the use of broad variety of LV sources for feeding back their energy.

An aspect relates to a method for supporting a bidirectional energy flow between a medium-voltage grid and a low-voltage electricity consumer site. The method comprise the steps:

- transforming, by utilizing a power feeding system, an AC medium-voltage power signal from the medium-voltage grid into a low-voltage power signal for the electricity consumer site;
- outputting, from the electricity consumer site, a first low-voltage signal;
- feeding a second low-voltage signal, which is based on the first low-voltage signal, into a low-voltage multiphase DC/AC-converter, which is arranged antiparallel to the power feeding system;
- forwarding a low-voltage multiphase signal from the output of the low-voltage multiphase DC/AC-converter to an LV/MV multiphase transformer; and transforming, by utilizing the LV/MV multiphase transformer, the low-voltage multiphase output signal into an output-signal that is conformant to the AC medium-voltage power signal.

In various embodiments, the power feeding system comprises a Line Interphase Transformer, LIT. The LIT may be a multi-pulse LIT with a pulse number of 12, of 18, of 24, or of higher than 24.

In various embodiments, the conversion of the DC medium-voltage power signal to the low-voltage power signal for the electricity consumer site is achieved by a modular DC/DC converter with large step-down gain and medium frequency transformers for galvanic insulation.

In various embodiments, the method further comprises the step of filtering, by utilizing a first inductor, the AC medium-voltage power signal from the power feeding system, and the AC medium-voltage power signal from the LV/MV multiphase transformer.

An aspect relates to a bidirectional power supply system described above and/or below for delivering energy from a medium-voltage grid to a low-voltage electricity consumer site and from the low-voltage electricity consumer site to the medium-voltage grid.

An aspect relates to a use of a bidirectional power supply system as described above and/or below for delivering energy from a medium-voltage grid to a low-voltage electricity consumer site (LV site) and from the LV site to the medium-voltage grid. The low-voltage electricity consumer site may be a charging box and/or a charging pole for charging electric vehicles, a data-center, and/or a plurality of low-voltage drives, and is configured to deliver energy from batteries, from a solar panel, and/or from other energy producing devices. As a further example, a manufacturing site with electricity consumers, e.g. electric motors, and a plurality of solar panels, e.g. installed on the roof, may be the LV site.

REFERENCE SIGNS

10 power supply system
11 medium-voltage grid/MV grid
11*a*, 11*b*, 11*c* phases of the MV grid
12 MV/LV-transformer
13 transformer
14 LV/LV-transformer
15 MV/LV-MFT
17 LV/LV-MFT
19 charging poles
20 first inductors 20*a*, 20*b*, 20*c*
22*a*, 22*b*, 22*c* inputs of the LIT
23 Line Interphase Transformer, LIT
25 LIT-based rectifier
29 LV power signal
30 converter
40 multiphase DC/AC-converter
41, 42 low-voltage signal
44 switching subsystem
46 second inductor
49 multiphase output signal
50 multiphase transformer
59 MV output-signal
60 low-voltage site, LV site
68, 69 low-voltage power signal
70 flowchart
71-75 steps All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power supply system for a bidirectional energy flow between a medium voltage (MV) grid and a low-voltage (LV) electricity consumer site, the system comprising:

a power feeding system configured for transforming an AC medium-voltage power signal from the medium-voltage grid into a low-voltage power signal for feeding the electricity consumer site, wherein the power feeding system comprises a Line Interphase Transformer (LIT); and a backward branch, configured for feeding energy from the LV electricity consumer site to the MV grid, the backward branch comprising:

a low-voltage multiphase converter configured for transforming a second low-voltage signal, which is based on a first low-voltage signal from the electricity consumer site, into a low-voltage multiphase signal, wherein the multiphase converter is arranged antiparallel to the power feeding system, wherein the low-voltage multiphase converter is an active filter that injects current, based on the signal of the MV grid; and an LV/MV multiphase transformer configured for transforming the low-voltage multiphase signal into an output-signal that is conformant to the AC medium-voltage power signal.

2. The power supply system of claim 1, wherein the LIT is a multi-pulse LIT with a pulse number of at least 12.

3. The power supply system of claim 1, further comprising a first inductor arranged between the AC medium-voltage power signal and the power feeding system, and arranged between the AC medium-voltage power signal and the LV/MV multiphase transformer.

4. The power supply system of claim 1, wherein the LV multiphase DC/AC-converter comprises a multiphase switching subsystem and a second inductor, which is arranged between the multiphase switching subsystem and the LV/MV multiphase transformer.

5. The power supply system of claim 1, further comprising a converter that is configured for transforming the first low-voltage signal from the electricity consumer site, into the DC low-voltage signal, and wherein the converter is a DC/AC-converter, an AC/AC-converter, and/or an AC/DC-converter with a DC/AC-converter.

6. A method for supporting a bidirectional energy flow between a medium-voltage (MV) grid and a low-voltage (LV) electricity consumer site, the method comprising:

transforming, by utilizing a power feeding system, an AC medium-voltage power signal from the medium-voltage grid into a low-voltage power signal for the electricity consumer site, wherein the power feeding system comprises a Line Interphase Transformer (LIT);

outputting, from the electricity consumer site, a first low-voltage signal;

feeding energy from the LV electricity consumer site to the MV grid using a backward branch configured for:

feeding a second low-voltage signal, which is based on the first low-voltage signal, into a low-voltage multiphase DC/AC-converter that is arranged antiparallel to the power feeding system;

forwarding a low-voltage multiphase signal from the output of the low-voltage multiphase DC/AC-converter to an LV/MV multiphase transformer, wherein the low-voltage multiphase converter is an active filter that injects current, based on the signal of the MV grid; and transforming, by utilizing the LV/MV multiphase transformer, the low-voltage multiphase output signal into an output-signal that is conformant to the AC medium-voltage power signal.

7. The method of claim 6, wherein the LIT is a multi-pulse LIT with a pulse number of at least 12.

8. The method of claim 6, further comprising filtering, by utilizing a first inductor, the AC medium-voltage power signal from the power feeding system, and the AC medium-voltage power signal from the LV/MV multiphase transformer.

* * * * *